United States Patent [19]
Rasmussen et al.

[11] Patent Number: 5,597,001
[45] Date of Patent: Jan. 28, 1997

[54] PORTABLE EQUIPMENT WASH STATION WITH RETRACTABLE FLOORING SYSTEM

[75] Inventors: Royce C. Rasmussen, Salt Lake City; Victor D. McFarland, West Jordan, both of Utah

[73] Assignee: Royce Industries, L.C., Salt Lake City, Utah

[21] Appl. No.: 489,222

[22] Filed: Jun. 12, 1995

[51] Int. Cl.[6] .................................................. B08B 3/02
[52] U.S. Cl. .................... 134/104.2; 134/123; 134/111; 137/312
[58] Field of Search .................... 134/123, 199, 134/104.2, 111; 137/312

[56] References Cited

U.S. PATENT DOCUMENTS

| | | |
|---|---|---|
| 1,719,055 | 7/1929 | Herzer . |
| 1,884,819 | 10/1932 | Osborne .................................. 134/111 |
| 1,955,199 | 4/1934 | Menge .................................... 134/111 |
| 3,773,255 | 11/1973 | Schoulties . |
| 4,010,896 | 3/1977 | Stockton . |
| 4,279,263 | 7/1981 | Pulliam ................................... 134/123 |
| 4,300,721 | 11/1981 | Rich . |
| 4,981,391 | 1/1991 | Klementovich . |
| 5,090,588 | 2/1992 | Van Roamer et al. . |
| 5,099,872 | 3/1992 | Tarvin et al. . |
| 5,205,306 | 4/1993 | Peterson . |
| 5,423,339 | 6/1995 | Latimer .................................. 134/123 |

*Primary Examiner*—Frankie L. Stinson
*Attorney, Agent, or Firm*—Thorpe North & Western, L.L.P.

[57] ABSTRACT

A portable equipment wash station employing a retractable flooring system. The retractable flooring system typically utilizing three layers. The first pad being a ground cover layer which employs a heavy duty material suitable for protecting the other layers from the ground. The second pad being a berm pad which is constructed so as to incorporate containment walls along the perimeter of the pad. The containment walls serving to contain contaminated water and route such contaminated water to recycling, storage, or disposal as desired in the given application. The third pad being a track pad. The track pad employing a mesh material and track strips. The mesh material allowing for the flow of contaminated water through the track pad for containment in the berm pad. The track strips providing an area on which the tires or tracks of a vehicle or other equipment may be driven. The track strips providing protection of the mesh material and other pads from the wear and tear which might otherwise be caused by contact with the tires or tracks of a vehicle or other equipment. The equipment wash station also incorporates wash equipment, recycling equipment, fuel storage, water storage, and storage for contaminated materials.

16 Claims, 10 Drawing Sheets

PORTABLE EQUIPMENT WASH STATION WITH RETRACTABLE FLOORING SYSTEM

BACKGROUND

1. The Field of the Invention

This invention relates generally to equipment for washing vehicles and other large equipment and more specifically to a portable, self-contained wash system employing a retractable flooring system for collection of contaminated water, the contaminated water then being recycled and reused, if possible, or stored for later appropriate disposal.

2. The Background Art

A variety of equipment for washing automobiles and other equipment is well known in the art. Automatic or manual car wash bays can be found in most communities. Automatic car wash equipment often employ rotating brushes, moving cloth strips, or brushless technology.

The rotating brushes and moving cloth strips contact the surface to be cleaned and provide a scrubbing action. Brushless technology attempts to provide the same effect with fast moving high pressure streams.

A variety of manual car washing equipment is also well known. Commonly, application of soap or other cleaning agent is accomplished through use of an application wand, brush, or sponge. Similarly, rinsing may involve the use of various equipment one example being a high pressure hose equipped with a spray nozzle.

Both automatic and manual wash equipment typically involve the use of a service bay in which the cleaning action takes place. Typical arrangements of automatic wash service bays include a bay in which the vehicle is parked and the wash equipment moves around the vehicle and a bay which the vehicle moves through various stages of the wash cycle, the wash equipment being substantially stationary.

Manual wash bays are typically only of the first type. A vehicle is pulled into the bay and manually washed by a user. In this type of bay, the wash equipment is usually at least somewhat mobile in that it is capable of being repositioned to a desired location by a user in order to accomplish the desired cleaning effect. The wash equipment may be moveable along a track within the bay, deployed via a reel which allows for deployment and retraction of a hose through which cleaning and rinse solution may be pumped, or may be repositioned by other means.

Typically the service bays utilized for both automatic and manual vehicle wash stations are permanently installed in a given location. Such service bays are often constructed in a convenient location or in connection with a fuel station.

Stations which are portable to varying degrees are also known. These stations are designed for relative ease of construction and tear down and utilize a open beam or lattice construction. The components of such a service bay are transported to a site where the service bay is then erected. Although such an installation is typically intended to be at least semi-permanent, the service bay may be torn down and reconstructed on another site.

One type of flooring system sometimes utilized in portable wash stations involves the use of a vinyl sheet. The sheet is unrolled or otherwise spread on the ground or pad where washing is to take place. The vehicle to be washed is moved onto the vinyl sheet for cleaning and washing. The vinyl sheet provides an relatively inexpensive floor which can be erected and disassembled quickly.

Vinyl sheeting is also relatively easily cleaned. By employing a vinyl flooring, cross contamination between consecutive vehicles cleaned can be substantially reduced or eliminated. This may be of particular importance where the vehicles being cleaned have been exposed to potentially hazardous or toxic waste and cross contamination is highly undesirable.

Unfortunately, such vinyl sheeting floors also have a number of drawbacks. Among these are the relative fragility of such sheets. Vinyl sheets may tear, wear through, or otherwise become damaged, particularly if the vehicles being cleaned are heavy equipment or tracked vehicles. The cleaning of heavy equipment on a vinyl sheet may necessitate the use of an expensive heavy duty sheet, the frequent replacement of sheets, or both.

Such vehicle cleaning systems have also been known to incorporate recycling systems. Particularly in climates where water is a scarce commodity, recycling of wash water may help to minimize the amount of water required while maximizing the number of vehicles which can be washed.

Such systems typically involve the recapture of a substantial amount of the wash water used. This contaminated water is then recycled for use in further washing or for use in rinsing. Recycling may involve a variety of steps.

A typical recycling system might first separate grease and oil from the contaminated water. Grease and oil are commonly found in the contaminated water since they are products used by vehicles to operate. After removal of the grease and oil the contaminated water might be routed through a number of filters designed to remove sediment. A separation system designed to remove solid particles not removed by the filtering system might also be employed.

Unfortunately, these systems are typically geared toward water conservation only. Although water conservation is an important issue, other issues are arising with regard to the removal of contaminates from equipment involved in cleaning up or working in areas containing toxic waste or other environmental hazards.

In such instances, it is imperative to clean as much of the contaminates from the equipment involved as possible before the equipment is placed back in service in a non-environmentally hazardous environment. Containing the contaminates washed from the equipment for proper disposal is also a critical issue. These issues are not adequately addressed by currently available systems which were not designed with such needs in mind.

It would therefore be an advancement in the art to provide a portable equipment wash station which requires minimal set up, is capable of being self contained, incorporates a mechanism allowing for transportation, and which can contain contaminates removed from equipment during the cleaning process for later disposal.

BRIEF SUMMARY AND OBJECTS OF THE INVENTION

In view of the above described state of the art, the present invention seeks to realize the following objects and advantages. The present invention provides a transportable, self-contained system for washing vehicles and other equipment utilizing a retractable flooring system. In a presently preferred embodiment the inventive equipment wash station employs a container in which is housed the retractable flooring system, wash equipment, recycling equipment, storage tanks for fuel and water, as well as storage tanks for the contaminated water and sludge collected from the wash process.

The system may be run from the water and fuel stored in the storage tanks of the container or may be connected to external supplies of water and fuel. The water storage tank is approximately 2000 gallon capacity. The fuel storage tank is of approximately 1000 gallon capacity. If external supplies of water and fuel are utilized the system may be run substantially continuously.

The container is designed to be transportable via a number of different transportation methods including train, semi-trailer, and shipboard transportation. Once the container has been transported and positioned in the desired location the retractable flooring system may be deployed.

A preferred embodiment of the retractable flooring system employs three layers. The first, or ground cover layer, is constructed of particularly heavy duty material which covers the ground and protects the remaining layers from damage which might otherwise occur from direct contact with the ground.

The second, or berm pad layer, is constructed to form containment walls around the perimeter of the retractable flooring system. A variety of methods of forming the containment walls may be employed including inflatable containment walls or containment walls designed to spring into position once deployed. The containment walls serve to contain contaminated water for routing to recycling equipment or storage for later disposal.

The third, or track pad layer, is constructed of a mesh material onto which are affixed strips of heavy duty material which form paths for the tires or tracks of the equipment to be cleaned. The mesh material allows the contaminated water to flow through for containment by the berm pad. The strips of heavy duty material over which the tires or tracks run serve to protect the mesh material as well as the berm pad from wear and tear.

The track strips may be designed to be replaceable. If the track strips are replaceable, the overall life of the retractable flooring system may be increased since the track strips serve to protect the mesh material and the berm pad from damage.

Each pad is folded in order to be retracted onto the roller housed inside the container. To deploy each pad a user pulls the pad out to the full length. The pads are then unfolded to form the floor of the inventive equipment wash station. In this way the pads can be of double or triple the width of the rollers onto which they are retracted. As will be appreciated, each layer must be fully deployed before the next layer can be deployed.

Deployment of each layer can be accomplished by firmly grasping the end protruding from the roller and pulling outward. In order to retract the pad, however, additional leverage is required. A relatively heavy duty u-joint and crank can be employed for this purpose. Such a system allows a user to retract the pad with substantially less effort than would otherwise be required. Alternatively, motorized deployment and retraction systems may be incorporated.

When in use, water contained within the berm pad is routed via a pump system to recycling equipment or for storage. If the contaminated water is to be recycled for additional use it undergoes a series of treatments to remove grease, oil, sediment, solids and the like.

Accordingly, it is a primary object of the present invention to provide a portable equipment wash station.

It is a further object of the present invention to provide a flooring system which is particularly suited to withstand the movement of heavy equipment and tracked vehicles onto and off of the wash site.

It is a further object of the present invention to provide an equipment wash station which allows for ease of deployment of an associated flooring system.

It is a still further object of the present invention to provide a flooring system which can be deployed over a variety of terrain.

An additional object of the present invention is to provide a flooring system which contains the contaminated water for routing to recycling, storage, or disposal as desired in a particular application.

Yet another object of the present invention is to provide an equipment wash station which can be transported in a variety of ways including via semi-trailer, train, shipboard, or other method.

A further object of the present invention is to provide a self-contained system which can carry supplies of fuel and water adequate to provide cleaning for a number of vehicles or other equipment.

A still further object of the present invention is to provide containment of environmentally hazardous materials for later proper disposal for remediation applications.

These and other objects of the present invention will become more fully apparent from the following description and appended claims or may be learned by the practice of the invention as set forth herein.

BRIEF DESCRIPTION OF THE DRAWINGS

In order to more fully understand the manner in which the above-recited and other advantages and objects of the present invention are obtained, a more particular description of the invention briefly described above will be rendered by reference to the presently understood best mode for making and using the same, as illustrated in the appended drawings. Understanding that these drawings depict only typical embodiments of the invention and are, therefore, not to be considered as limiting of its scope, the invention will be described with additional specificity and detail through the use of the accompanying drawings in which.

DETAILED DESCRIPTION OF THE PREFERRED EMBODIMENTS

Figure 1:
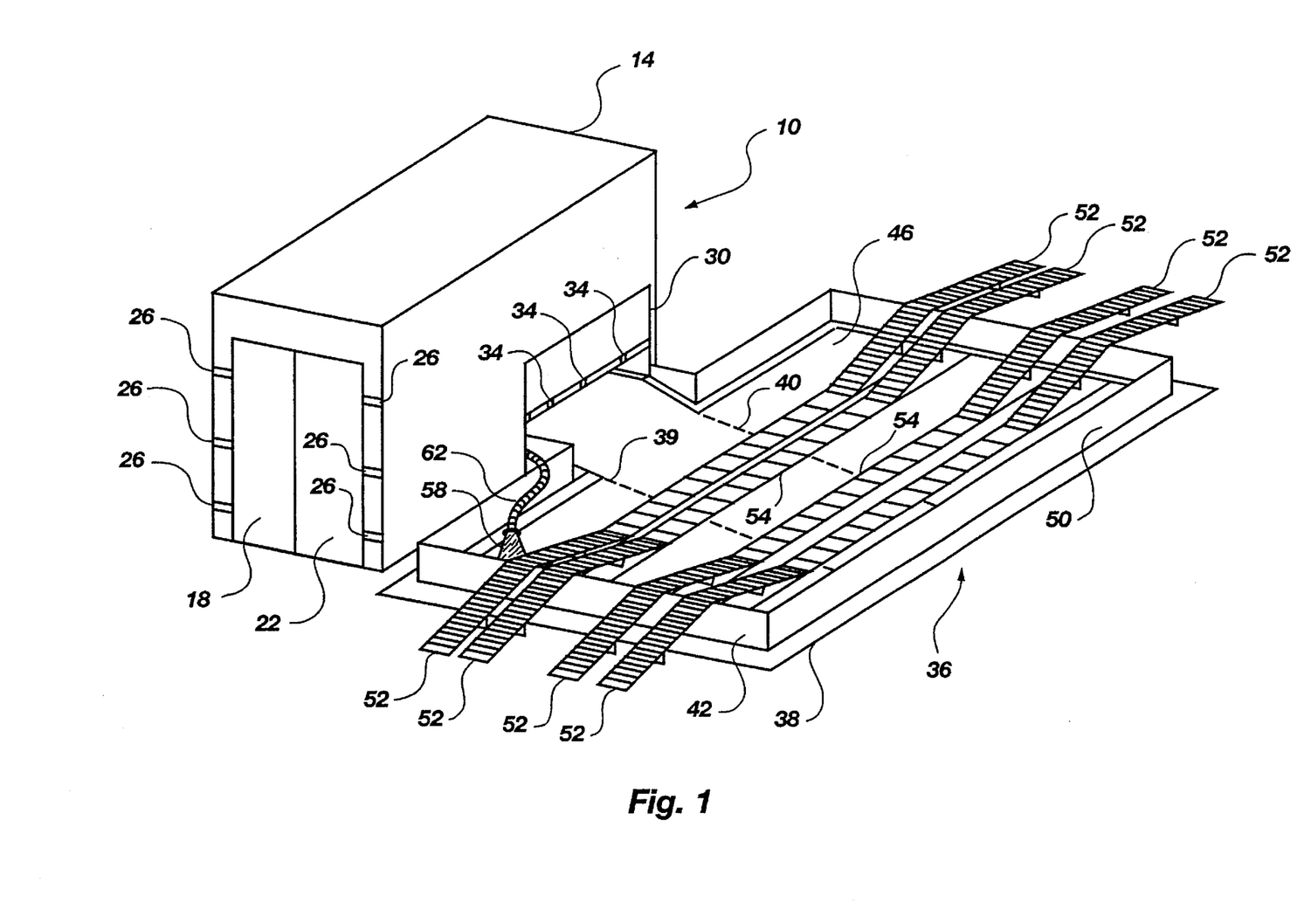
FIG. 1 is a perspective view of the equipment washing system of the present invention showing the retractable flooring in the deployed position.

Reference is now made to the embodiments and methods illustrated in FIGS. 1 through 9 wherein like numerals are used to designate like parts throughout. In FIG. 1 the retractable flooring system is shown in relation to the container of the present invention designated generally at 10. Container 14 houses the cleaning equipment, generators, holding tanks, and other devices used associated with the cleaning of vehicles and heavy equipment.

Container 14 incorporates a left hand rear access door 18 and a right hand rear access door 22. These rear access doors are mounted to container 14 via rear hinges 26 which allow the rear access doors to swing out to open and in to close. Left hand rear access door 18 and right hand rear access door 22 may be individually opened or both opened, as desired.

An additional access door, shown as a side access door 30, is incorporated in container 14. Side access door 30 is mounted to container 14 via side hinges 34. Side access door 30 swings up to open or down to close. Side access door 30 allows access to the rollers on which the portable retractable flooring, for the cleaning system of the present invention, is housed. Side access door 30 is designed to engage a mechanism which maintains side access door 30 in an open position. In this way, side access door 30 is prevented from interfering with access to the retractable flooring.

In a presently preferred embodiment, the retractable flooring, designated generally at 36, employs three layers. Ground pad 38 is deployed first to cover the terrain and form a base layer. Ground pad 38 is deployed in a folded arrangement. In a preferred embodiment, ground pad 38 is folded to a size of approximately 20 feet when being deployed or retracted. Further, ground pad 38 includes two folded sections which, when unfolded, serve to triple the width of ground pad 38 such that the total deployed length of ground pad 38 is approximately fifty-four feet and the approximate width is fifty feet.

As illustrated, ground pad 38 would be folded in thirds substantially along first fold line 39 and second fold line 40. As will be appreciated other folding arrangements and lengths may be employed to conform to the specifications of a given application.

Berm pad 42 is deployed second and rests substantially on top of ground pad 38. Track pad 46 is deployed last and rests substantially on top of berm pad 42. In a preferred embodiment both berm pad 42 and track pad 46 will be folded in thirds, as described above in relation to ground pad 38, when being deployed or retracted.

Ground pad 38 is preferably made of vinyl coated nylon although other material such as treated canvas or other tarpaulin material could be employed. Ground pad 38 serves to protect the other pads from sharp stones, jagged or rough surfaces, and other surface anomalies which might damage the other pads.

Berm pad 42 is designed to rest on top of ground pad 38 and provide a capture basin. Berm pad 42 employs a raised perimeter section 50 which functions to trap and hold liquids used in the cleaning process. Raised perimeter section 50 is designed to form a berm or partial wall 51 around the perimeter of berm pad 42. This creates a capture basin which maintains substantially all liquids and other materials within the confines of berm pad 42. Liquids and other materials may then be recycled or stored. Berm pad 42 is preferably made of a vinyl coated nylon material although other waterproof or substantially water resistant materials can be employed.

Figure 2:
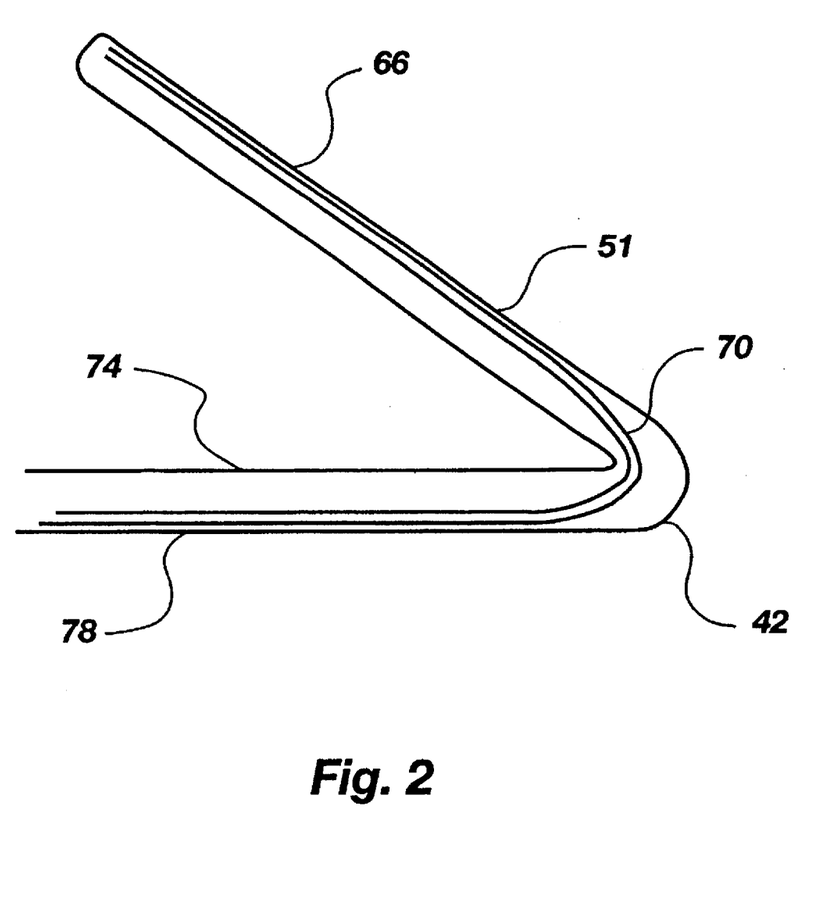
FIG. 2 is a cross sectional view of a berm pad employing a springing containment wall.

Berm 51 may be an additional strip of material which is manufactured so as to tend to spring into an upright position, as shown in FIG. 2. Alternatively berm 51 may be manufactured as a pocket which can be inflated to form a partial wall.

Referring back to FIG. 1, access ramps 52 may be employed to protect berm 51 from injury and to maintain all fluids and materials within the perimeter of berm pad 42. Access ramps 52 are designed to allow a vehicle or other equipment to drive over berm 51 without displacing or crushing it. Although both a springing berm and an inflatable berm may be designed to be driven over, use of access ramps 52 can extend the life of either design.

The use of access ramps 52 can also help to insure that little if any of the fluids captured within berm pad 42 are allowed to escape. This is particularly crucial in applications where environmentally hazardous materials are involved. In applications where remediation work is taking place and the present system is employed to help contain hazardous materials and prevent their spread, it is critical to insure that as much material as possible is contained within berm pad 42.

Track pad 46 is designed to rest on top of berm pad 42. Track pad 46 is preferably constructed of a nylon mesh material which allows liquids and other materials to flow through and be collected in berm pad 42. Other mesh material such as flexible graphite screen or other screen material may also be employed.

The density and size of openings in the screen or mesh material may be adjusted depending on the precise application if desired. For example, in applications where it is important to collect and recycle or dispose of as much solid waste as possible, it may be desirable to utilize a fine mesh or screen so as to maintain the solid wastes on top of the flooring system and only allow liquids and minimal sediment to pass through the screen material. In other applications, the mesh or screen material may be course to allow larger particles to flow through.

The density of openings in the screen material may also be adjusted to aid in extending the life of the associated recycling equipment. If the recycling equipment is designed to handle solid materials in a certain size range, the mesh or screen may be adjusted to permit only particles smaller than a particular size to pass.

A plurality of track strips 54 are attached to the outermost surface of track pad 46. Track strips 54 are designed to protect the more delicate material of track pad 46 and underlying berm pad 42. Track strips 54 are preferably constructed of so called potato belting material although other heavy duty materials such as canvas can be employed.

Track strips 54 may also be constructed as an integral part of berm pad 42. This may be accomplished by enclosing track strips between layers of berm pad 42 or by a variety of other means. It will be appreciated, however, that it is typically most effective to utilize track pad 46 and track strips 54 so as to have a system which is easily serviceable or replaceable.

As will be appreciated, the materials of the pads are susceptible to damage from heavy vehicles or other equipment. An especially severe example would be the movement of a tank onto the flooring for cleaning. The metal tracks would tend to gather and rip the material of the pads, causing particular damage to berm pad 42. By employing track strips 54, this damage is minimized or avoided entirely.

Track strips 54 also avoid damage or long term degradation from the movement of equipment across track pad 46. Military tracked vehicles, for example, utilize a number of different track configurations such as steel tracks, half tracks, and rubber cleats. Other tracked vehicles such as bulldozers and motor graders also utilize a variety of track configurations which can cause substantial damage to berm pad 42 or ground pad 38. In addition, trucks may utilize tires with a variety of treads. Although the less aggressive tread of a highway tire might do little initial damage, over time the cumulative effect would be to significantly reduce the life of track pad 46 and underlying berm pad 42 as well. The more aggressive track often found on truck tires would simply serve to heighten this effect.

Track strips 54 are preferably constructed of a heavy duty material which will allow heavy equipment to be repeatedly driven over track strips 54 without damage. Track strips 54 may deteriorate over time and with extended use, however, and require replacement. Track strips 54 may be attached to track pad 46 by sewing, adhesive, or any other method which forms a bond adequate to hold up in the extreme conditions under which the track pad 46 and track strips 54 will be utilized.

Also depicted in FIG. 1 is sump pump 58 and associated hose 62. In applications where the pads are deployed onto soft material such as sand or loose earth, a portion of the underlying material can be dished out prior to deployment of flooring 36 so as to form a depression under the material of the pads. Waste fluids then tend to flow toward and collect in the resulting lower area of flooring 36. This method allows for the placement of sump pump 58 directly onto the flooring 36 and for conveyance of waste fluids to the recycler, storage tanks, or other desired location.

In the event that flooring 36 is deployed onto a hard surface such that direct use of a sump pump is not possible, a vacuum hose is deployed on flooring 36 and waste water is drawn through the hose to a remote pump location. The remote pump is typically a sump pump contained in a barrel or other receptacle which serves to pump the waste fluids to recycling, holding tanks, or other desired location.

In use, the ground pad 38, berm pad 42, and track pad 46 are deployed at the desired location. If used, access ramps 52 are placed across perimeter section 50 so that vehicles being driven onto the pads will cross over partial wall 51 and onto track strips 54. The vehicle is then washed and moved off of the wash site.

Turning to FIGS. 2 an embodiment of the side wall 51 of berm pad 42 is depicted. In FIG. 2, a springing side wall designated generally as 66 is depicted. Springing side wall 66 is designed to fold flat during deployment or retraction and to spring into position once deployed is depicted. As shown, a shape retaining plastic member 70 is encased between an upper layer 74 and a lower layer 78 of material. Shape retaining plastic member 70 is manufactured so as to be inclined to assume an l-shape but to be capable of being folded flat as well.

Figure 3:
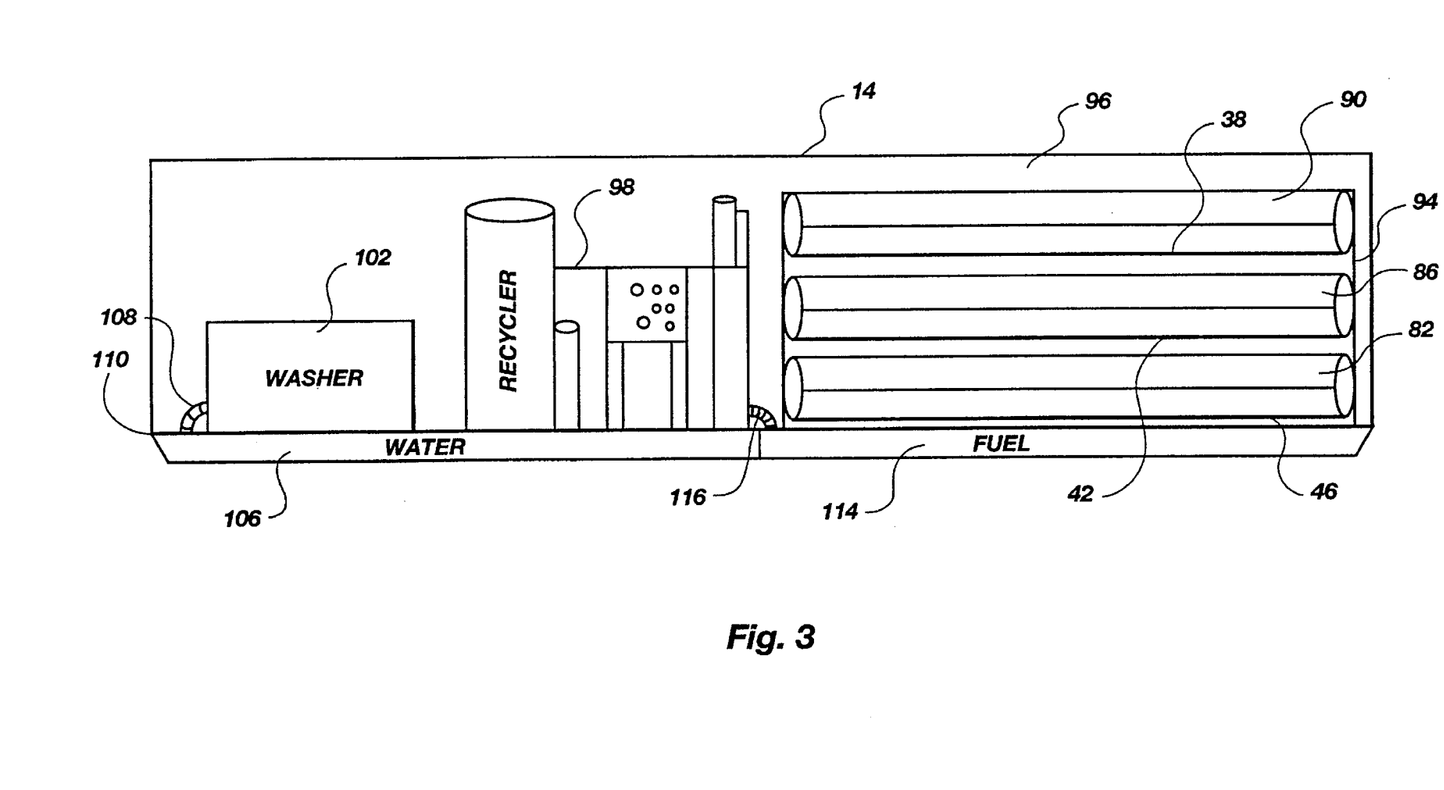
FIG. 3 is a side view of the interior of the container housing the equipment washing system of the present invention.

FIG. 3 depicts a side view of container 14 with the side panel removed so as to show the equipment contained therein. In this view, the rollers on which the pads are stored are visible. As depicted, a presently preferred embodiment would employ three rollers, a first roller 82, a second roller 86, and a third roller 90. A frame 94 would house the three rollers. Care should be taken to manufacture frame 94 so as to accommodate the weight of the rollers and the pads without deflecting or swaying to such an extent that proper operation of the system is impaired. First roller 82, second roller 86, third roller 90 and roller frame 94 collectively are referred to as roller bar assembly 96.

First roller 82 would be positioned so as to be closest to ground level and would accommodate track pad 46. Second roller 86 would be positioned above first roller 82 and would accommodate berm pad 42. Third roller 90 would be positioned above second roller 86 and would accommodate ground pad 38.

The placement of track pad roller 82, berm pad roller 86 and ground pad roller 90 above one and another allows for maximization of use of space within container 14. In addition, the rollers are substantially independent from one and other and thus unlikely to interfere with each other. Also, the stacked arrangement allows for efficient design of frame 94 and shared use of deployment means.

Figure 8:
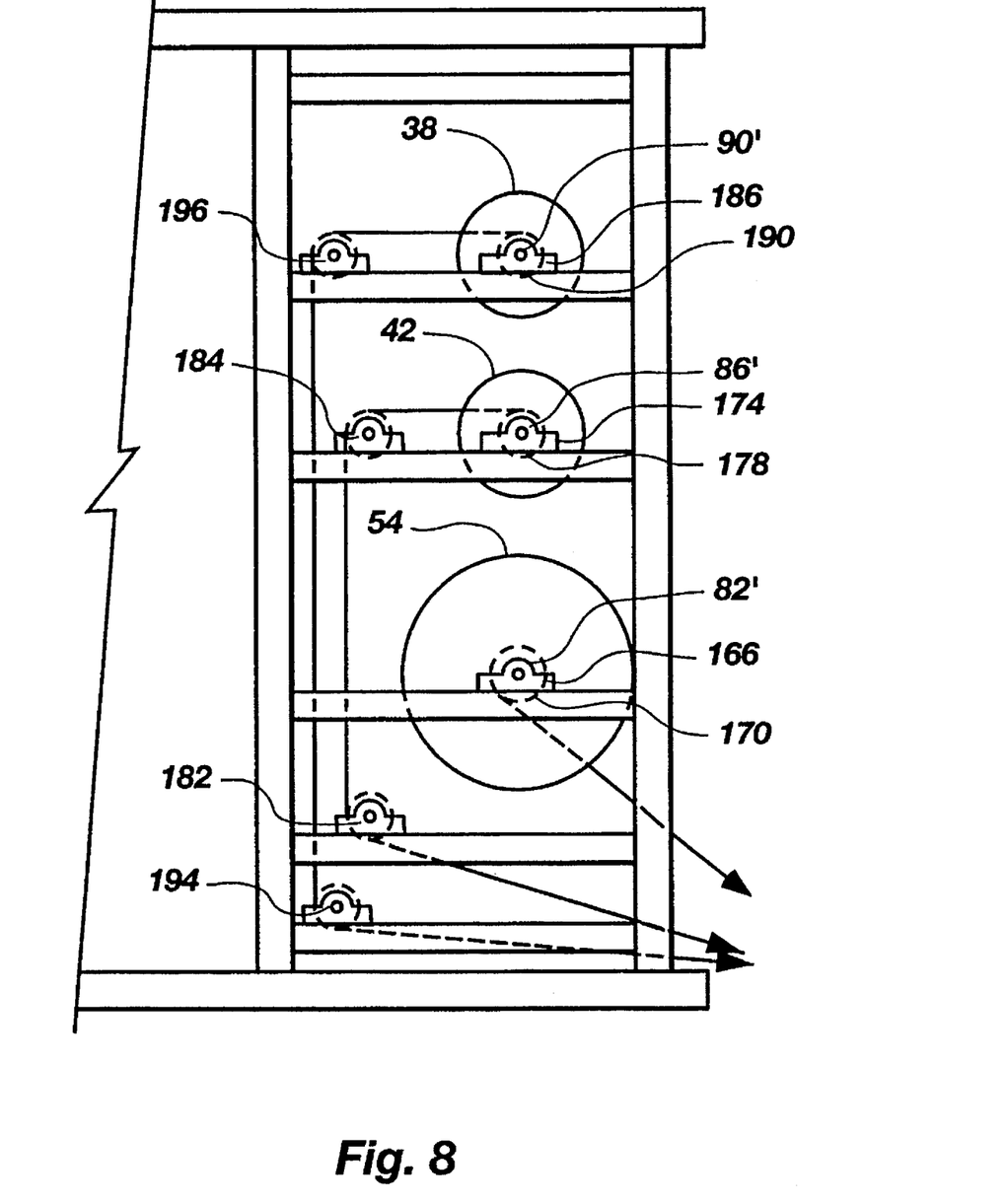
FIG. 8 is a end view of a roller assembly employing a motorized means for retracting and, if desired, assisting in deployment of the flooring of the present invention.

As will be appreciated, all three pads will be required to have some excess length which will remain in engagement with the roller even when the pad is fully deployed. The pads are deployed as indicated in FIG. 8, which will be discussed in detail below, In FIG. 3, as will be further appreciated, track pad 46 will require the least additional length due to its engagement with first roller 82 which is positioned closest ground level. Berm pad 42 will require a somewhat longer extra length, approximately the equal to the height of the distance from berm pad roller 86 to ground level, due to its engagement with second roller 86 located intermediate to first roller 82 and third roller 90. Ground pad 38 will require the greatest additional length, again approximately equal to the height of the third roller 90 from ground level, due to its interaction with third roller 90 which is located farthest from ground level.

Also depicted in FIG. 3 is a side view of the recycling equipment shown generally at 98. Recycling equipment 98 serves to recycle contaminated water collected in and received from berm pad 42. Recycling equipment 98 would typically employ a series of filters, settling tanks, and separation equipment to remove oil, grease, particulate matter and other contaminates from the water collected in berm pad 42.

Power washer 102 is also shown in FIG. 3. Power washer 102 provides the pressurized water and fluid flow for the cleaning operation. Water is routed into power washer 102 from water holding tank 106 through conduit 108. Water holding tank is depicted as being located beneath floor 110 of container 14. By placing water holding tank beneath floor 110, space interior to container 14 is available to house other equipment. It will be appreciated, however, that water holding tank 106 could be placed in a number of locations, including above floor locations, without affecting the general performance of the system.

Fuel tank 114 used to supply fuel to the system is depicted as being positioned below floor 110 of container 14 in a similar fashion to water tank 106. Fuel is directed through a plurality of fuel lines to generators which produce the power for the system. Incorporating fuel tank 114 below floor 110 also adds to the space available for the placement of other equipment. Again, it will be appreciated that fuel tank 114 might be positioned in a number of other locations.

Figure 3A:
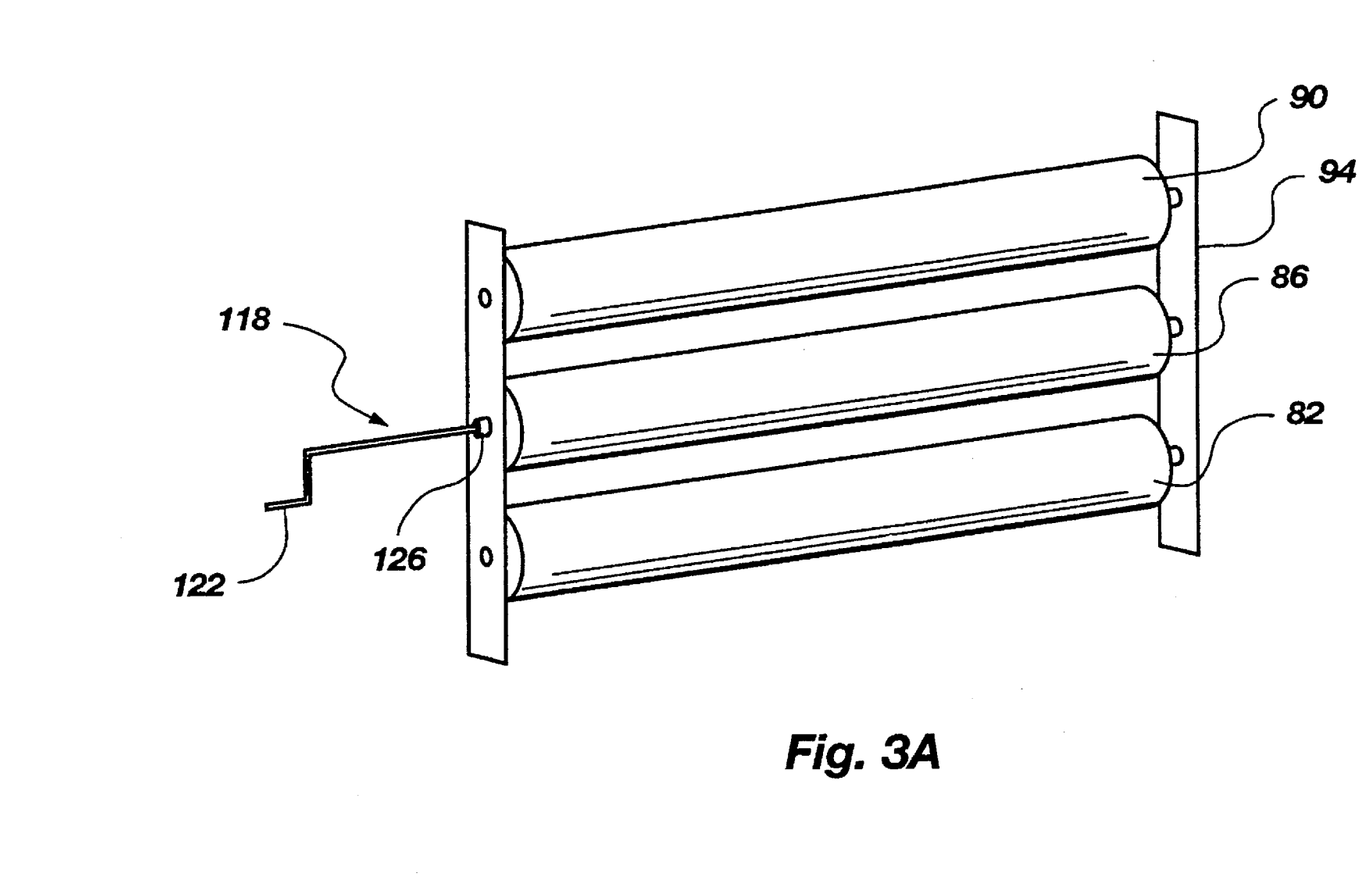
FIG. 3A is a detail of a crank system for retracting the pads onto the rollers housed in the container.

FIG. 3A shows additional detail of one embodiment of frame 94 and associated first roller 82, second roller 86, and third roller 90 for holding ground pad 38, berm pad 42, and track pad 46 respectively. In this view, a crank type retraction mechanism, shown generally at 118, is depicted. Retraction mechanism 118 incorporates a crank handle 122 which intermeshes with receiver 126 to allow a user to retract a pad by rotating crank handle 122.

Figure 4:
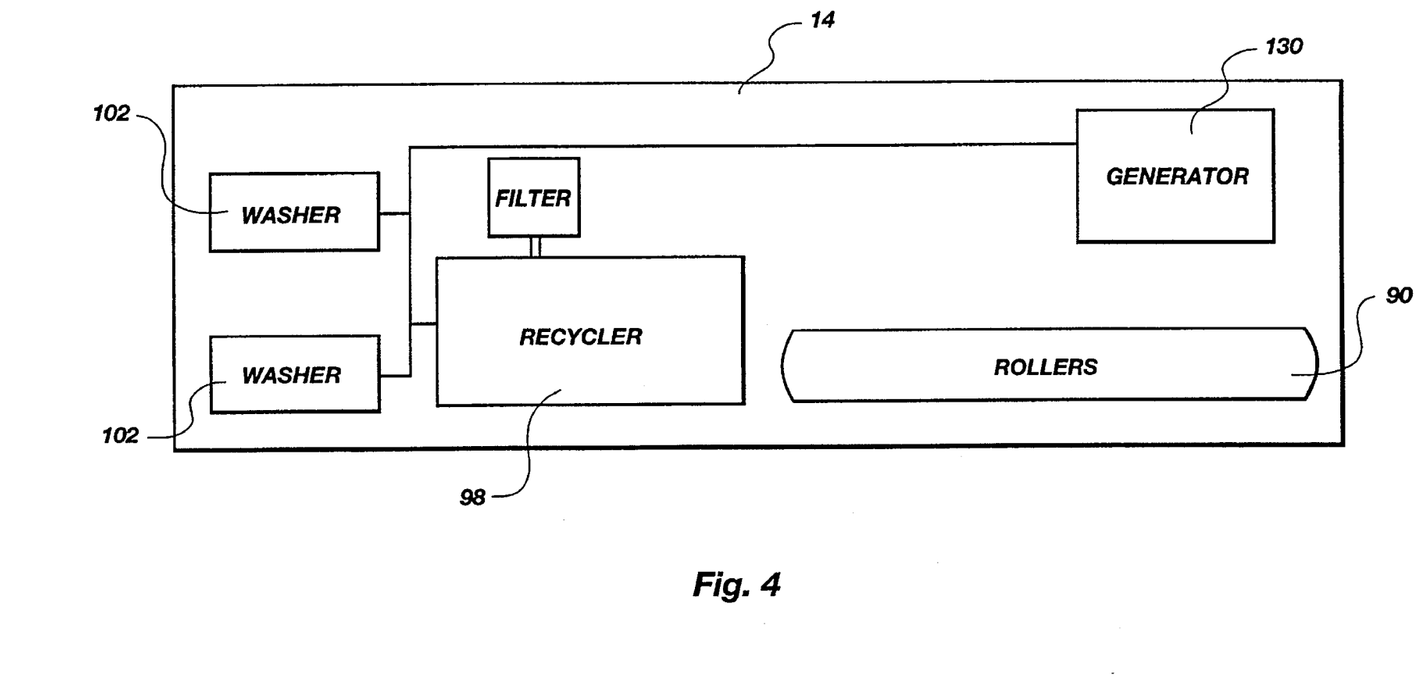
FIG. 4 is a top view of the interior of the container which houses the equipment washing system of the present invention.

Turning to FIG. 4, a top view of the equipment interior to container 14 is shown. In this view, third roller 90 is visible but occludes the other two rollers. Recycling equipment 98 is also shown are power washers 102. In this view, generators 130 and filter 134 are also depicted.

Generator 130 provides power for the system. Power is generated from the fuel held within the system. The fuel tank is positioned beneath the floor as depicted in FIG. 3 which holds approximately 1000 gallons of fuel. This amount of fuel allows for a number of hours of operation of the system independent of any outside power source.

The system may also incorporate provisions for connecting to an external fuel supply so as to increase the length of time during which the system can operate without the need to refuel. The system may also be equipped to utilize power supplied from an alternate source such as an external generator or other external power source.

Referring back to FIG. 3, the water tank 106, which holds approximately 2000 gallons of water, is shown incorporated beneath the floor 110 of the container 14. This would yield a variable number of hours of operating time for the system depending on whether the water was recycled and reused or stored for disposal.

The climate conditions in which the system is operating can also effect the operating time available. It will be appreciated that water evaporates more quickly in a dry and arid climate that in a humid climate. Thus, systems operating in arid climates will experience a grate reduction in water available for recycling due to evaporation.

The system may also be connected to an exterior supply of water. Operation time will then be dependent on the availability of water from the alternate source as well as the capacity of water tank 106 of the system.

Figure 5:
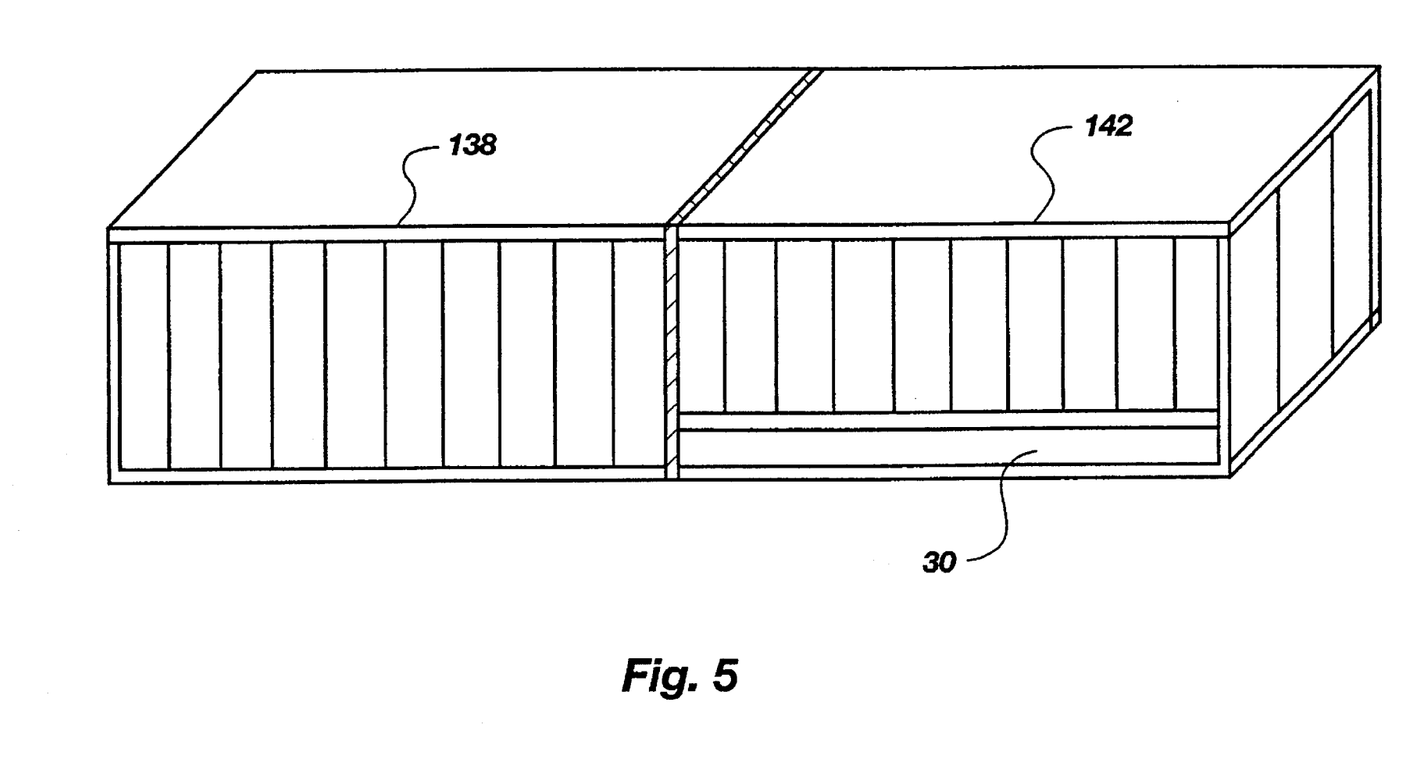
FIG. 5 is a side view of a dual container embodiment of the present invention.
Figure 6:
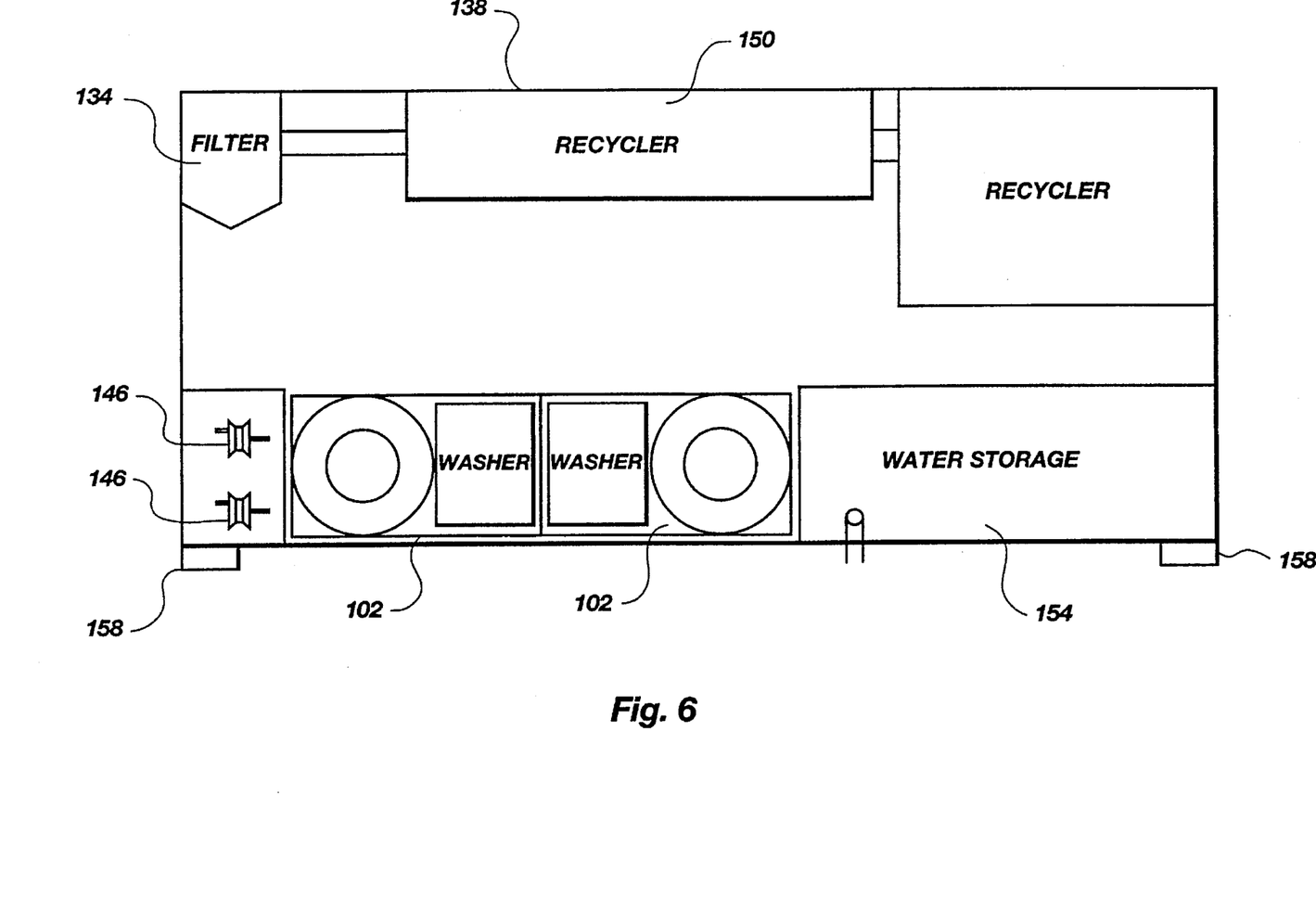
FIG. 6 is a top view of the wash equipment container of the dual container embodiment of FIG. 5.
Figure 7:
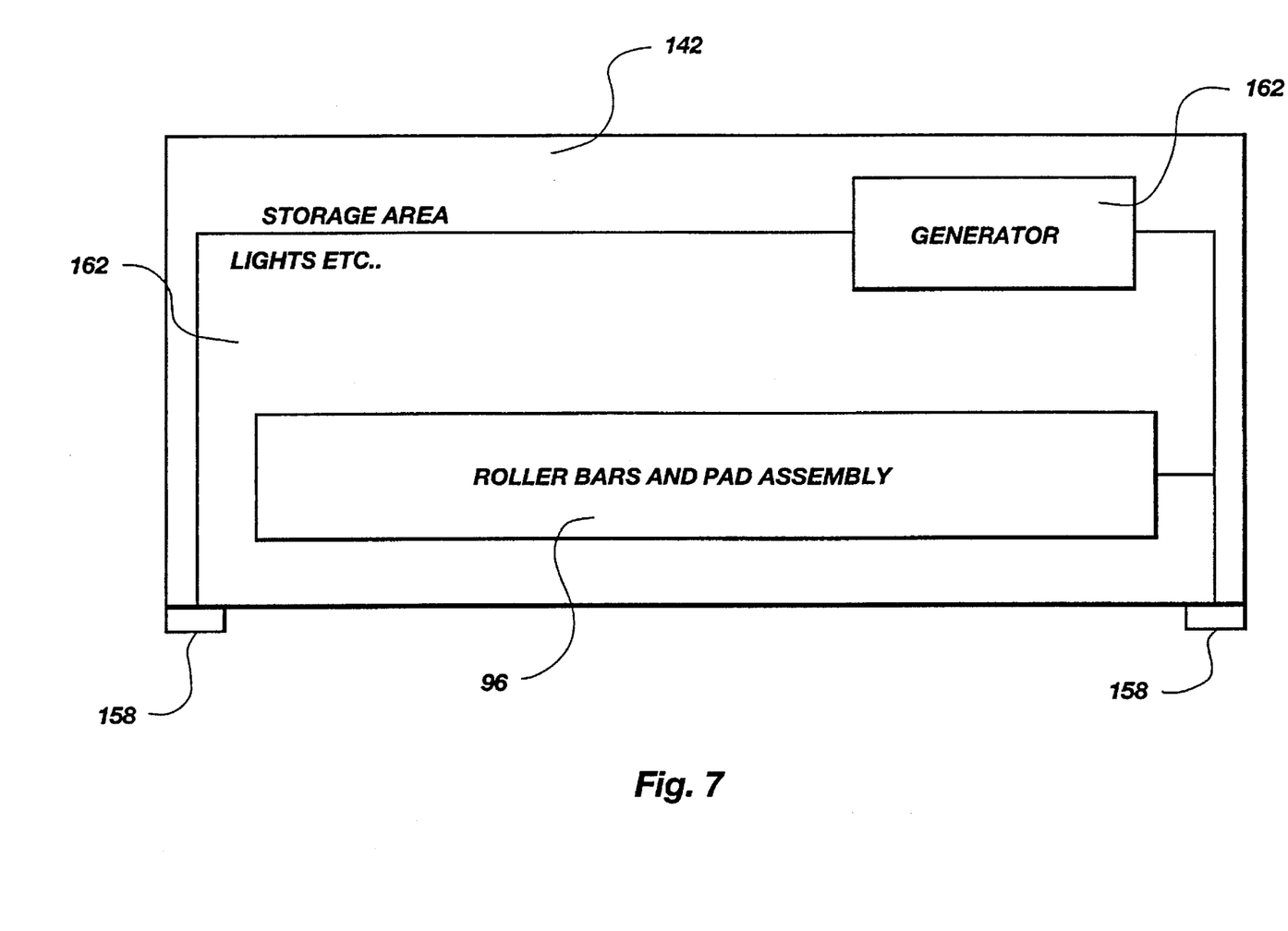
FIG. 7 is a top view of the roller assembly container of the dual container embodiment of FIG. 5.

FIGS. 5 through 7 illustrate an alternate embodiment of the present invention utilizing two containers. In this embodiment two containers, approximately equal in size, are employed to house and transport the portable equipment wash station. A first container 138 houses the wash equipment, as shown in FIG. 6. The second container 142 houses the flooring and associated rollers as well as the generator, as shown in FIG. 7. Also shown is access door 30 through which the various pads (not shown) are deployed. In this embodiment, access door 30 is incorporated as part of second container 142. As will be appreciated, various other configurations could be employed. It is, however, preferable in most cases, to contain all of the flooring components in one container.

Both first container 138 and second container 142 are approximately 8 to 9 feet in width and 20 feet in length. This size allows the containers to be more easily accommodated for transportation. In addition, the use of a plurality of smaller containers may allow for the use of the portable equipment wash station in cramped or confined quarters.

One such use might involve the washing of equipment aboard air craft carriers. As will be appreciated, air craft carriers must carry a variety of equipment on board both for use in missions the carrier may be involved in as well as for the more routine functions associated with maintaining the crew required to operate the carrier. Thus, space is at a premium and the use of a plurality of smaller containers to house the portable equipment wash station may be necessitated.

FIG. 6 depicts the interior of first container 138 from a top view. As shown, this embodiment incorporates hose reels 146, power washers 102, filter 134, a closed loop water recycling unit 150, and a water storage tank 154. In this embodiment, water storage tank 154 is a stand alone unit rather than being incorporated into the floor of either first container 138 or second container 142 (not shown). As will be appreciated, this equipment can be varied depending on the needs at a particular wash location.

In this embodiment, lights 158 are also incorporated to allow the portable equipment wash station to be utilized at night or in low light situations. Lights 158 will typically derive their power from the power source of the portable equipment wash station although external power may also be utilized.

FIG. 7 depicts the interior of second container 142 from a top view. As shown, the roller bar assembly 96 and a generator 162 are incorporated in second container 142 in this embodiment. Area 162 may be used for storage or other equipment as desired. Lights 158 are also incorporated in second container 142 to allow for use of the portable equipment wash station at night or in low light situations.

Figure 9:
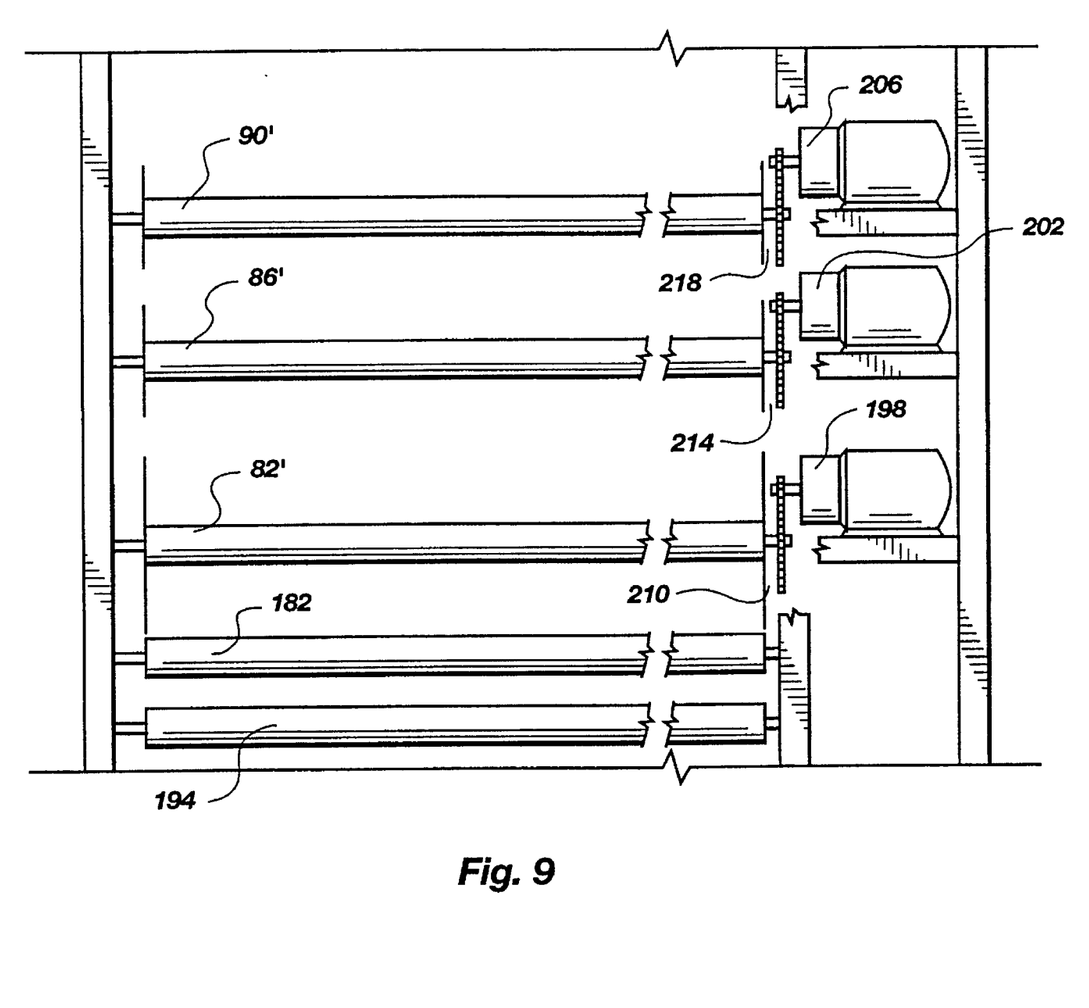
FIG. 9 is a side view of the motorized roller assembly, portions of the roller frame are shown cutaway so as to better view the interaction of the motors, gear boxes, and rollers.

Turning to FIGS. 8 and 9 an alternate embodiment of the roller bar assembly 96 is depicted. In this embodiment, a motorized system for retracting the ground pad 38, berm pad 42, and track pad 54 is depicted. As shown, track pad roller 82', berm pad roller 86', and ground pad roller 90' each have an associated motor. Track pad motor 166 engages track pad roller 82 through track pad engagement means 170. Engagement means 170 will typically be of the chain and pulley type although chain and gear or belt and pulley arrangements could also be employed.

Berm pad motor 174 engages berm pad roller 86' via berm pad engagement means 178 in a similar fashion as track pad motor 174 and track pad engagement means 170. In addition, however, berm pad 42 engages lower berm pad idler roller 182 and upper berm pad idler roller 184. Berm pad idler rollers 182 and 184 route berm pad 42 behind and below track pad 46.

Ground pad motor 186 engages ground pad roller 90' via ground pad engagement means 190 in a similar method to that discussed in relation to berm pad 42 above. Ground pad 38 also engages lower ground pad idler roller 194 and upper ground pad idler roller 196 so as to route ground pad 38 below and behind both berm pad 42 and track pad 46.

FIG. 11 further illustrates the configuration of track pad roller 82', berm pad roller 86', ground pad roller 90', berm pad idler roller 182, and ground pad idler roller 194. In this figure, the rollers are shown without the associated pads in place. As illustrated, track pad motor 174 employs a gear box assembly 198. As will be appreciated, gear box assembly is configured so as allow for relatively large torque to turn the track pad roller 82' with a small motor. Berm pad gear assembly 202 and ground pad gear assembly 206 operate in a similar fashion although some adjustments may be required to compensate for the varying weight and size of each pad.

Gear box assemblies 198, 202, and 206 work in conjunction with pulley and chain assemblies 210, 214, and 218 respectively. As will be appreciated belt and pulley assemblies, chain and gear assemblies, or other similar assemblies could be utilized to accomplish this interface.

As will be appreciated, the use of motorized means for retraction and, if desired, to assist in the deployment of the covers and pads associated with the flooring system of the present invention serve to reduce the manpower required for deployment and retraction of the flooring system. In addition, use of motorized means may substantially reduce the time to deploy or retract the flooring system and thus aid in reducing the time to install or de-install the system.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An equipment cleaning station for the washing of contaminants from vehicles and other equipment with a liquid and retaining contaminated wash liquid comprising:
   applicator means for applying wash liquid containing cleaning and rinsing agents to a vehicle or other equipment;
   a plurality of retractable flooring layers for providing a floor to overlie existing terrain and on which to apply the wash liquid to the vehicle or other equipment and retaining contaminated wash liquid comprising:
      a ground pad layer for covering the existing terrain and providing protection to the other layers of retractable flooring;
      a berm pad layer for containing contaminated wash liquid resulting from the washing of the vehicle or other equipment; and
      a track pad layer for allowing contaminated liquid to flow through to the berm means while also providing protection against damage which could result from contact of the ground pad means or berm pad means with tires or tracks of the vehicle or other equipment being cleaned; and
   a portable container means for housing the applicator means and retractable flooring layers thereby providing transportability of the equipment cleaning station.

2. An equipment cleaning station as defined in claim 1 further comprising retraction means for retracting each of the plurality of retractable flooring layers onto an associated roller housed within the portable container means.

3. An equipment cleaning station as defined in claim 1 wherein the portable container means further comprises transportation means for allowing train car transportation.

4. An equipment cleaning station as defined in claim 1 wherein the portable container means further comprises wheeled transportation means for allowing semi-trailer transportation.

5. An equipment cleaning station as defined in claim 1 wherein the portable container means further comprises stackable transportation means for allowing shipboard transportation.

6. An equipment cleaning station for the washing of contaminants from vehicles and other equipment with a liquid and retaining contaminated wash liquid comprising:
   applicator means for applying wash liquid containing cleaning and rinsing agents to a vehicle or other equipment;
   a plurality of retractable flooring layers for providing a floor to overlie existing terrain and on which to wash the vehicle or other equipment and retain contaminated wash liquid comprising:
      a ground pad layer for covering the existing terrain and providing protection to the other layers of retractable flooring;
      a berm pad layer for containing contaminated wash liquid resulting from the washing of the vehicle or other equipment; and
      a track pad layer for allowing contaminated liquid to flow through to the berm pad means while also providing protection against damage which could result from contact of the ground pad means or berm pad means with tires or tracks of the vehicle or other equipment being cleaned;
   a recycling means for recycling contaminated wash liquid for further use; and
   a portable container means for housing the applicator means, retractable flooring layers and recycling means thereby providing transportability of the equipment cleaning station.

7. An equipment cleaning station as defined in claim 6 further comprising retraction means for retracting each of the plurality of retractable flooring layers onto an associated roller housed within the portable container means.

8. An equipment cleaning station as defined in claim 6 wherein the portable container means further comprises transportation means for allowing train car transportation.

9. An equipment cleaning station as defined in claim 6 wherein the portable container means further comprises wheeled transportation means for allowing semi-trailer transportation.

10. An equipment cleaning station as defined in claim 6 wherein the portable container means further comprises stackable transportation means for allowing shipboard transportation.

11. An equipment cleaning station for the washing of contaminants from vehicles and other equipment with a liquid and retaining contaminated wash liquid comprising:
    applicator means for applying wash liquid containing cleaning and rinsing agents to a vehicle or other equipment;
    a plurality of retractable flooring layers for providing a floor to overlie existing terrain and on which to wash the vehicle or other equipment and retain contaminated wash liquid comprising:
       a ground pad layer for covering the existing terrain and providing protection to the other layers of retractable flooring;
       a berm pad layer for containing contaminated wash liquid resulting from the washing of the vehicle or other equipment; and
       a track pad layer for allowing contaminated liquid to flow through to the berm pad means while also providing protection against damage which could result from contact of the ground pad means or berm pad means with tires or tracks of the vehicle or other equipment being cleaned;
    a recycling means for recycling contaminated wash liquid for further use;
    a plurality of storage means for storing the inputs and outputs of the system; and
    a portable container means for housing the applicator means, retractable flooring layers, recycling means, and storage means thereby providing transportability of the equipment cleaning station.

12. An equipment cleaning station as defined in claim 11 further comprising retraction means for retracting each of the plurality of retractable flooring layers onto an associated roller housed within the portable container means.

13. An equipment cleaning station as defined in claim 11 wherein the portable container means further comprises transportation means for allowing train car transportation.

14. An equipment cleaning station as defined in claim 11 wherein the portable container means further comprises wheeled transportation means for allowing semi-trailer transportation.

15. An equipment cleaning station as defined in claim 11 wherein the portable container means further comprises stackable transportation means for allowing shipboard transportation.

16. An equipment cleaning station as defined in claim 11 wherein the plurality of storage means comprises:

a fuel tank for storing the fuel necessary to provide power to the system;

a tank for providing clean wash liquid to the system;

a contaminated storage tank for storing contaminated wash liquid and particulate matter for later disposal.

* * * * *